United States Patent
Li

(10) Patent No.: US 12,013,803 B2
(45) Date of Patent: Jun. 18, 2024

(54) INTERFACE CIRCUIT AND ELECTRONIC DEVICE

(71) Applicant: VIVO MOBILE COMMUNICATION CO., LTD., Dongguan (CN)

(72) Inventor: Bo Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 29 days.

(21) Appl. No.: 17/988,372

(22) Filed: Nov. 16, 2022

(65) Prior Publication Data

US 2023/0071348 A1    Mar. 9, 2023

Related U.S. Application Data

(63) Continuation of application No. PCT/CN2021/095246, filed on May 21, 2021.

(30) Foreign Application Priority Data

May 25, 2020 (CN) .......................... 202010451086.5

(51) Int. Cl.
G06F 13/40 (2006.01)

(52) U.S. Cl.
CPC ...... *G06F 13/4022* (2013.01); *G06F 13/4068* (2013.01)

(58) Field of Classification Search
CPC .. G06F 13/4022; G06F 13/4068; G06F 3/385; G06F 1/266; Y02D 10/00
See application file for complete search history.

(56) References Cited

U.S. PATENT DOCUMENTS 6,351,818 B1    2/2002  Murai
8,200,879 B1    6/2012  Falik et al.
(Continued)

FOREIGN PATENT DOCUMENTS

CN    1758314 A    4/2006
CN    203324973 U    12/2013
(Continued)

OTHER PUBLICATIONS

China National Intellectual Property Administration, International Search Report issued in corresponding Application No. PCT/CN2021-095246 mailed Aug. 19, 2021.
(Continued)

*Primary Examiner* — Phong H Dang
(74) *Attorney, Agent, or Firm* — Stites & Harbison, PLLC; Jeffrey A. Haeberlin

(57) ABSTRACT

An interface circuit is provided, which includes an interface, a detection control module, a switch module, a first data line, and a second data line. A width of the second data line is smaller than that of the first data line, the interface is electrically connected to the detection control module and a movable end of the switch module, a first fixed end and a second fixed end of the switch module are electrically connected to the first data line and the second data line, respectively. When the detection control module detects that a signal of the interface is a power supply signal, the movable end of the switch module is connected to the first fixed end; when the detection control module detects that a signal of the interface is a data signal, the movable end of the switch module is connected to the second fixed end.

16 Claims, 4 Drawing Sheets

(56) References Cited

U.S. PATENT DOCUMENTS

| | | | |
|---|---|---|---|
| 2011/0043983 A1* | 2/2011 | Kondou | G06F 1/3203 |
| | | | 361/679.01 |
| 2013/0179603 A1 | 7/2013 | Tu et al. | |
| 2014/0312709 A1* | 10/2014 | Nakano | H02J 50/40 |
| | | | 307/104 |
| 2015/0324321 A1* | 11/2015 | Lin | G06F 1/266 |
| | | | 710/300 |
| 2016/0026551 A1 | 1/2016 | Kim et al. | |
| 2016/0247600 A1* | 8/2016 | Ritthammer | H01B 7/1825 |
| 2017/0005424 A1 | 1/2017 | Lee et al. | |
| 2020/0076204 A1 | 3/2020 | Chen et al. | |
| 2020/0366102 A1* | 11/2020 | Mishra | H02J 5/00 |
| 2021/0303046 A1* | 9/2021 | Trainor | G06F 13/385 |

FOREIGN PATENT DOCUMENTS

| | | |
|---|---|---|
| CN | 204559536 U | 8/2015 |
| CN | 106502939 A | 3/2017 |
| CN | 106921064 A | 7/2017 |
| CN | 207264378 U | 4/2018 |
| CN | 108415865 A | 8/2018 |
| CN | 109040424 A | 12/2018 |
| CN | 109101447 A | 12/2018 |
| TW | 200723007 A | 6/2007 |
| WO | 2017/128707 A1 | 8/2017 |

OTHER PUBLICATIONS

European Patent Office, Extended European Search Report issued in corresponding Application No. EP 21812371 mailed Sep. 22, 2023.

* cited by examiner

INTERFACE CIRCUIT AND ELECTRONIC DEVICE

CROSS-REFERENCE TO RELATED APPLICATIONS

The present application is a continuation of International Application No. PCT/CN2021/095246, filed on May 21, 2021, which claims priority to Chinese Patent Application No. 202010451086.5, filed with the Chinese Patent Office on May 25, 2020, and entitled "INTERFACE CIRCUIT AND ELECTRONIC DEVICE", which is incorporated herein by reference in its entirety.

TECHNICAL FIELD

The present application relates to the technical field of electronic devices, and in particular, to an interface circuit and an electronic device.

BACKGROUND

At present, 3C devices such as Android mobile devices, laptop computers, desktop computers, and even game consoles are equipped with interfaces. When connecting an external device, a user does not need to distinguish the front face and the back face of a male connector of the external device, which improves the user experience.

An interface in the prior art includes two pins. One pin is connected with a cable for transmitting information, and the other pin is connected with another cable connected with a main board to supply power to external devices. Before connecting the male connector of the external device with the interface, the user does not know in advance a cable used to supply power and a cable used to transmit information. Therefore, widths of the two cables need to be designed to be larger than a preset threshold, so that both cables can be used for power supply. For example, the widths of the two cables are required to reach 0.3 mm to 0.5 mm according to power of electricity supply. Usually, two cables need to be routed from a top chip to a PCB according to a cable width of 0.3 to 0.5 mm, then pass through an FPC, and then reach a connector on a sub-board. For some electronic device projects with small cable areas, cable design is usually difficult.

SUMMARY

According to a first aspect of the present disclosure, an interface circuit is provided, which includes an interface, a detection control module, a switch module, a first data line, and a second data line, where a width of the second data line is smaller than that of the first data line, the interface is electrically connected to the detection control module and a movable end of the switch module, a first fixed end of the switch module is electrically connected to the first data line, and a second fixed end of the switch module is electrically connected to the second data line;

in a case that the detection control module detects that a signal of the interface is a power supply signal, the movable end is connected to the first fixed end; and in a case that the detection control module detects that a signal of the interface is a data signal, the movable end is connected to the second fixed end.

According to a second aspect of the present disclosure, an electronic device is provided, where the electronic device is installed with the interface circuit described in the first aspect of the embodiments of the present application, and the first data line and the second data line are respectively electrically connected to a main control chip of the electronic device.

BRIEF DESCRIPTION OF DRAWINGS

The accompanying drawings illustrated herein are provided to further understand this application and form a part of this application. The exemplary embodiments of this application and the descriptions thereof are used to explain this application and do not constitute an improper limitation on this application. In the accompanying drawings.

DESCRIPTION OF EMBODIMENTS

The following clearly describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

Figure 1:
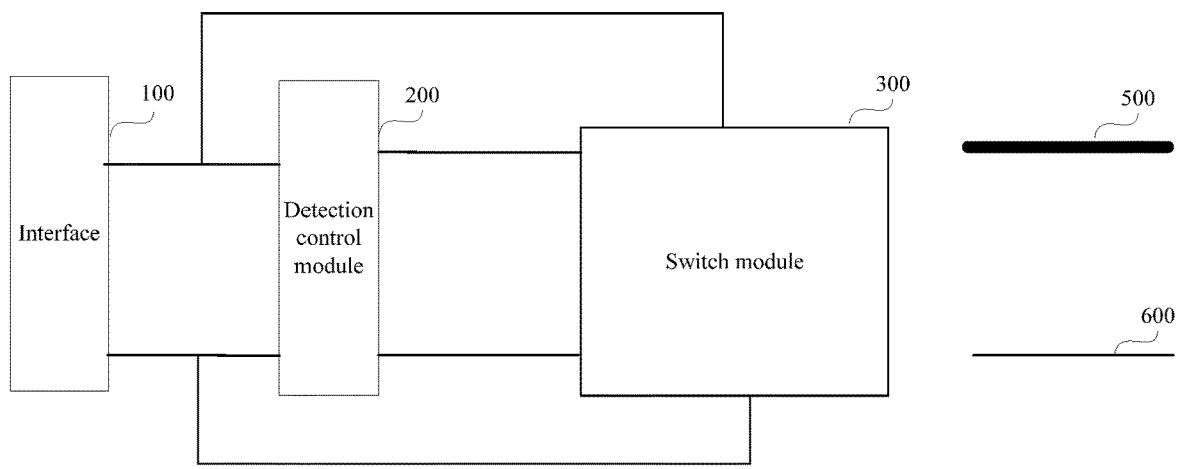
FIG. 1 is a circuit connection block diagram of an interface circuit provided by an embodiment of the present application.
Figure 2:
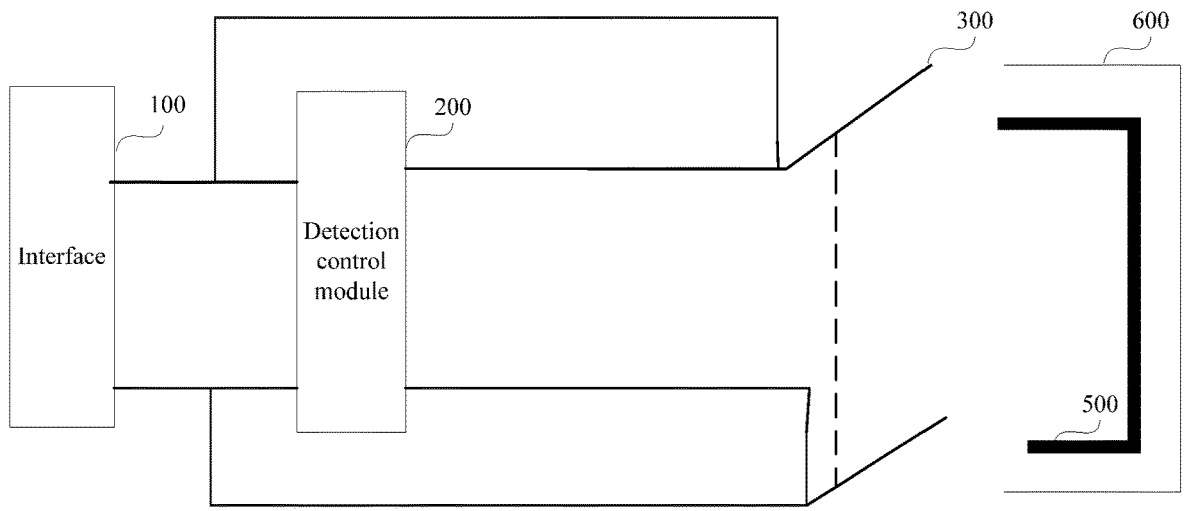
FIG. 2 is a circuit connection block diagram of an interface circuit provided by an embodiment of the present application.

FIG. 1 is a circuit connection block diagram of an interface circuit provided by an embodiment of the present application. As shown in FIG. 1, an interface circuit provided by an embodiment of the present application includes an interface 100, a detection control module 200, a switch module 300, a first data line 500, and a second data line 600. A width of the second data line 600 is smaller than that of the first data line 500. Alternatively, the width of the first data line 500 may be between 0.3 mm and 0.5 mm. For example, the width of the second data line 600 may be between 0.05 mm and 0.1 mm. In some embodiments, the width of the second data line may be 0.075 mm to ensure the convenience of material acquisition and reduce material costs. The width of the second data line 600 is smaller than the width of the first data line 500. The interface 100 is electrically connected to the detection control module 200 and the movable end of the switch module 300, the first fixed end of the switch module 300 is electrically connected with the first data line 500, and the second fixed end of the switch module 300 is electrically connected with the second data line 600.

The interface 100 can implement that the external device and the electronic device installed with the interface circuit perform communication interaction, and the electronic device installed with the interface circuit can supply power to the external device while the user does not need to distinguish the male connector of the external device. For example, the interface 100 can be a female socket of a TYPE-C interface. Of course, those skilled in the art can understand that the interface can also be other types of interfaces, such as a USB interface. In addition, the external device may be an earphone, a storage disk, or the like including a TYPE-C male connector.

When the detection control module 200 detects that the signal of the interface 100 is a power supply signal, the movable end is connected to the first fixed end.

When the detection control module 200 detects that the signal of the interface 100 is a data signal, the movable end is connected to the second fixed end.

In the interface circuit, the width of the second data line is set to be smaller than the width of the first data line, the interface is electrically connected to the detection control module and the movable end of the switch module, the first fixed end of the switch module is electrically connected to the first data line, and the second fixed end of the switch module is electrically connected to the second data line. When the detection control module detects that the signal from the interface is a power supply signal, the movable end is connected to the first fixed end. When the detection control module detects that the signal of the interface is a data signal, the movable end is connected to the second fixed end. This ensures that regardless of a pin of the interface to which an external signal is connected, a pin for data signal transmission is connected to the second data line. Since a voltage value that needs to be carried by the data cable used to transmit a data signal is generally smaller than a voltage value that needs to be carried by the data cable used to transmit a power supply signal, at the beginning of cable width design, the cable width of the cable used to transmit the data signal is designed to be smaller than the width of the cable used for power supply, to reduce the area of the cables on the circuit board.

Optionally, the interface 100 includes a first pin and a second pin. When the detection control module 200 detects that an input voltage of the first pin is higher than a threshold, the detection control module determines that a signal received by the interface 100 is a data signal, and the detection control module 200 controls the movable end of the switch module 300 to connect to the second fixed end, so that the first pin is electrically connected to the second data line, and the data signal is received by a subsequent processing circuit through the second data line. When the detection control module 200 detects that an input voltage of the second pin is lower than a threshold, the detection control module determines that a signal received by the interface 100 is a power supply signal, and the detection control module 200 controls the movable end of the switch module 300 to connect to the first fixed end, so that the second pin is electrically connected to the first data line, and the power supply signal is received by a subsequent processing circuit through the first data line.

Optionally, one end of the first data line is electrically connected to the fixed end of the switch module, and the other end of the first data line is electrically connected to the processing circuit; one end of the second data line is electrically connected to the fixed end of the switch module, and the other end of the second data line is electrically connected to the processing circuit. The processing circuit is a main control chip on the main board, such as a central processing unit (CPU). The main control chip can be configured to internally process data on the first data line and the second data line, and transmit the data to a designated device through a connector. In some embodiments of the present application, when the signal received by the pin of the interface is a power supply signal, the main control chip transmits the power supply signal from a processing main control end to the interface through the second data line, to complete power supply.

Optionally, the switch module 300 is a double-pole double-throw switch or at least two single-pole single-throw switches.

Optionally, the switch module 300 uses a double-pole double-throw switch, the first data line 500 includes a first connection end and a second connection end, and the second data line 600 includes a third connection end and a fourth connection end. The first pin of the interface 100 is connected to a first movable end of the double-pole double-throw switch, and the second pin of the interface 100 is connected to a second movable end of the double-pole double-throw switch. A first fixed end of the double-pole double-throw switch is connected to the third connection end, a second fixed end of the double-pole double-throw switch is connected to the second connection end, a third fixed end of the double-pole double-throw switch is connected to the first connection end, and a fourth fixed end of the double-pole double-throw switch is connected to the fourth connection end.

Figure 3:
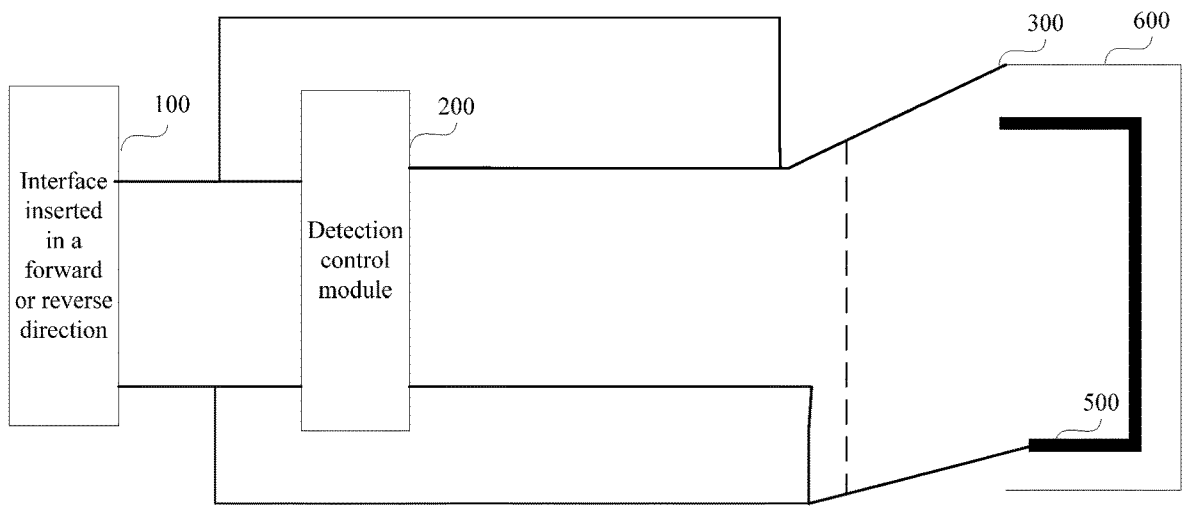
FIG. 3 is a circuit connection block diagram of an interface circuit provided by an embodiment of the present application.

Alternatively, as shown in FIG. 3, as an implementation manner, the detection control module 200 is further configured to: when detecting that an input voltage of the first pin is higher than a preset threshold and an input voltage of the second pin is lower than a preset threshold (that is, the external electronic device is inserted into the interface in a forward direction), control the first movable end of the double-pole double-throw switch to connect to the third connection end of the second data line, that is, the first fixed end of the switch module, and control the second movable end of the double-pole double-throw switch to connect to the second connection end of the first data line, that is, the second fixed end of the switch module.

Figure 4:
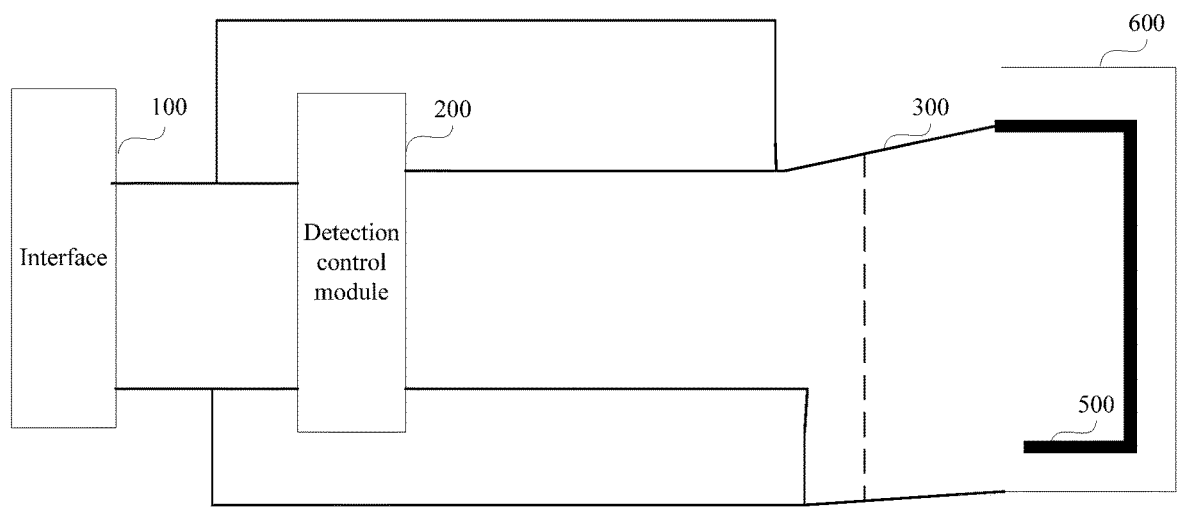
FIG. 4 is a circuit connection block diagram of an interface circuit provided by an embodiment of the present application.

Alternatively, as shown in FIG. 4, as another implementation manner, the detection control module 200 is further configured to: when detecting that an input voltage of the first pin is lower than a preset threshold and an input voltage of the second pin is higher than a preset threshold (that is, the external electronic device is inserted into the interface in a reverse direction), control the first movable end of the double-pole double-throw switch to connect to the first connection end of the first data line, that is, the third fixed end of the switch module, and control the second movable end of the double-pole double-throw switch to connect to the fourth connection end of the second data line, that is, the fourth fixed end of the switch module.

It should be noted that, in some embodiments of the present application, when the switch module 300 uses two single-pole single-throw switches, since the data line determined as the power supply cable needs to supply power from the processing chip to the interface, when the detection control module detects that the signal of the interface is a data signal, the single-pole single-throw switch connected to the pin is preferentially electrically connected to the second data line, and the other single-pole single-throw switch is then connected to the first data line.

Figure 5:
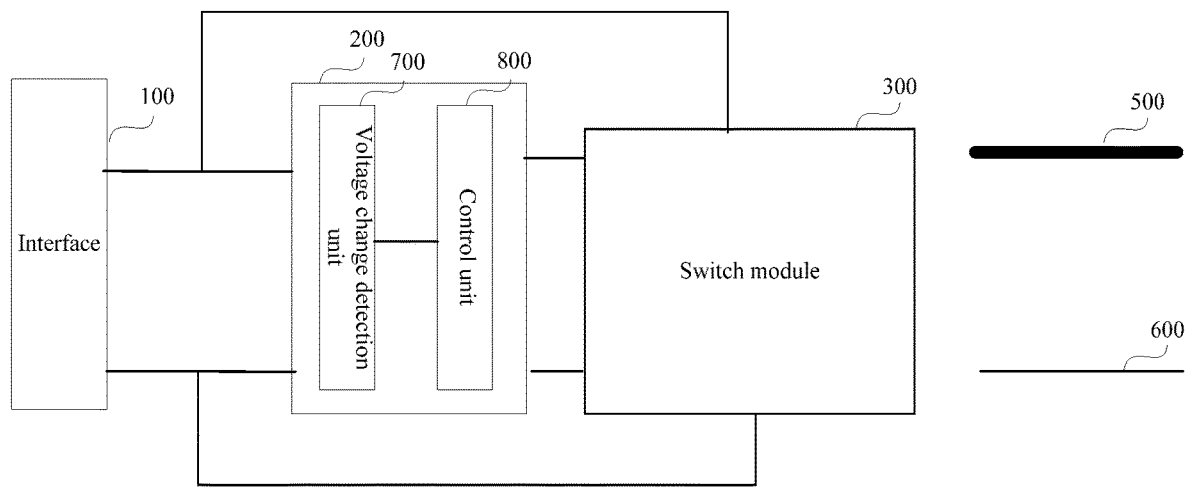
FIG. 5 is a circuit connection block diagram of an interface circuit provided by an embodiment of the present application.

Optionally, as shown in FIG. 5, the detection control module 200 includes a voltage change detection unit 700 and a control unit 800, and the interface 100, the voltage change detection unit 700, and the control unit 800 are electrically connected to each other in sequence. The voltage change detection unit 700 is configured to detect whether the voltages of the two pins of the interface 100 are greater than preset thresholds when the interface 100 is connected to an external device, and output a detection result to the control unit 800. The control unit 800 is configured to control, according to the detection result, the switch module 300 to be turned on.

Figure 6:
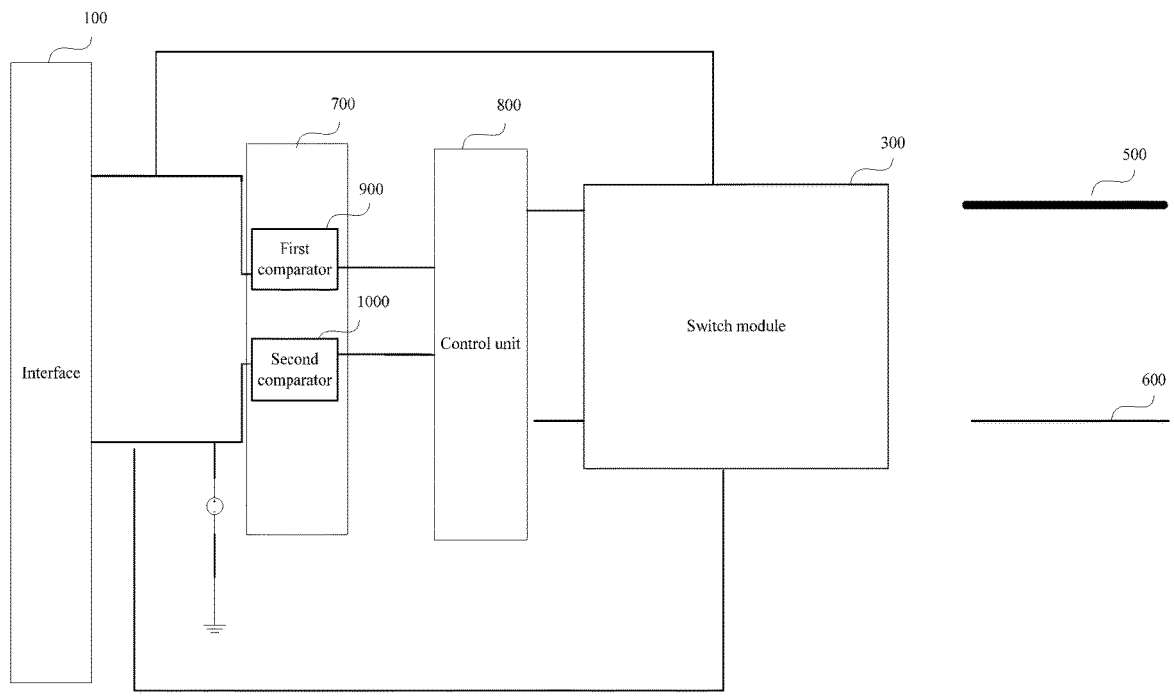
FIG. 6 is a circuit connection block diagram of an interface circuit provided by an embodiment of the present application.

Alternatively, as shown in FIG. 6, as an implementation manner, the voltage change detection unit 700 includes a first comparator 900 and a second comparator 1000. A first input end of the first comparator 900 is electrically connected to the one pin of the interface 100, a second input end of the first comparator 900 is connected to a reference voltage input end, and an output end of the first comparator 900 is electrically connected to the control unit 800; a first input end of the second comparator 1000 is electrically connected to the other pin of interface 100, a second input end of the second comparator 1000 is connected to the reference voltage input terminal, and an output end of the second comparator 1000 is electrically connected to the control unit 800.

The first comparator 900 is configured to compare a voltage input by the pin and a reference voltage to obtain a difference, and compare whether the difference is greater than a preset threshold, and if the difference is greater than the preset threshold, output a high level to the control unit 800. The control unit controls, according to a level change, a condition of turning on or off the switch module. The second comparator 1000 is also configured to compare a voltage input by the pin and a reference voltage to obtain a difference, and compare whether the difference is greater than a preset threshold, and if the difference is lower than the preset threshold, output a low level to the control unit 800. The control unit controls, according to a level change, a condition of turning on or off the switch module.

Figure 7:
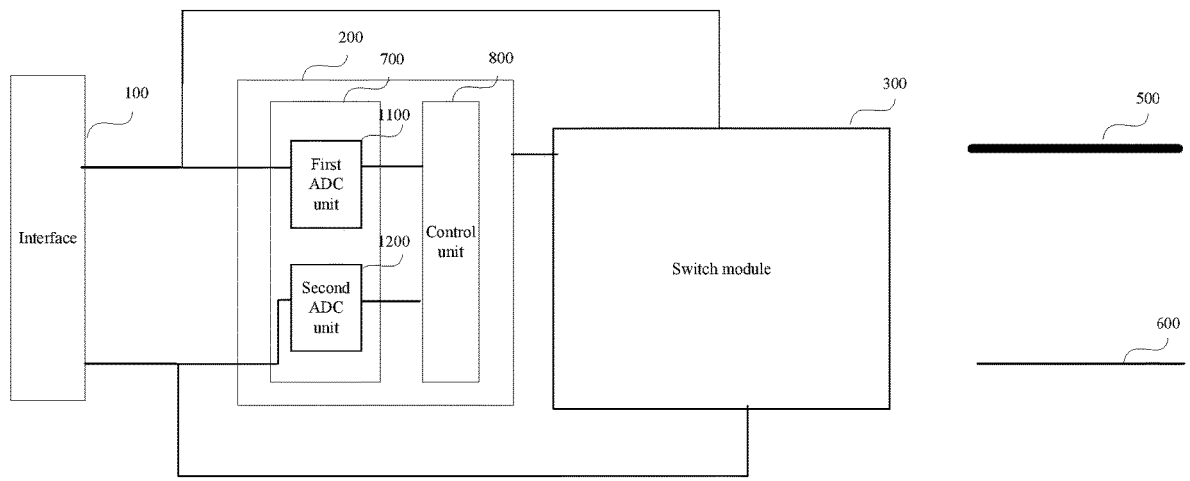
FIG. 7 is a circuit connection block diagram of an interface circuit provided by an embodiment of the present application.

Alternatively, as shown in FIG. 7, as another implementation manner, the voltage change detection unit 700 includes a first ADC unit 1100 and a second ADC unit 1200. An input end of the first ADC unit 1100 is electrically connected to one pin of the interface 100, an output end of the first ADC unit 1100 is electrically connected to the control unit 800; an input end of the second ADC unit 1200 is electrically connected to the other pin of the interface 100, and an output end of the second ADC unit 1200 is electrically connected to the control unit 800.

The first ADC unit 1100 is configured to compare whether a voltage input by the pin is greater than a preset threshold, and if the difference is greater than the preset threshold, output a high level to the control unit 800. The control unit controls, according to a level change, a condition of turning on or off the switch module. The second ADC unit 1200 is also configured to compare whether a voltage input by the pin is lower than a preset threshold, and if the difference is lower than the preset threshold, output a low level to the control unit 800. The control unit controls, according to a level change, a condition of turning on or off the switch module.

Figure 8:
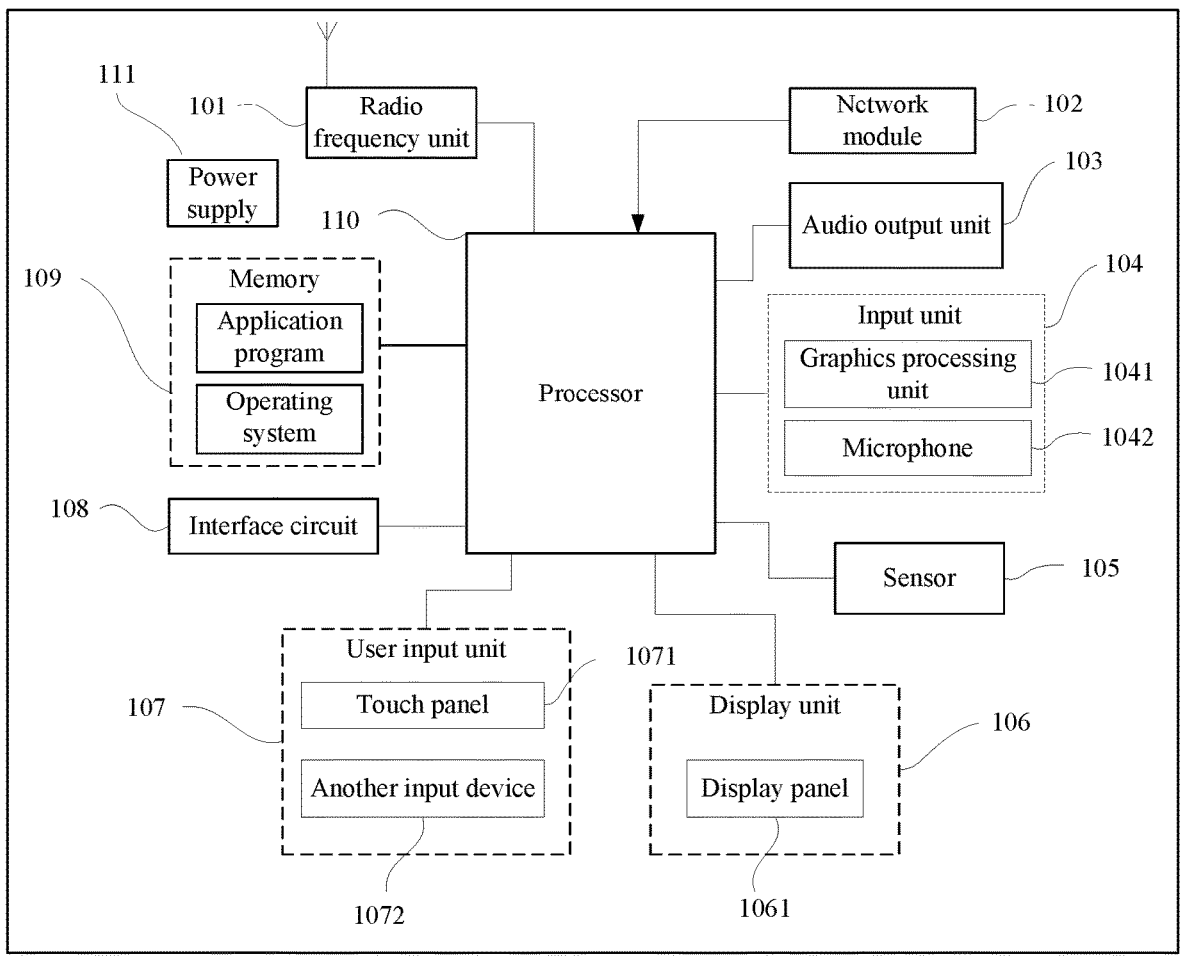
FIG. 8 is a circuit connection block diagram of an electronic device provided by an embodiment of the present application.

FIG. 8 is a schematic structural diagram of hardware of an electronic device implementing the embodiments of the present invention. The electronic device includes but is not limited to: a radio frequency unit 101, a network module 102, an audio output unit 103, an input unit 104, a sensor 105, a display unit 106, a user input unit 107, an interface unit 108, a memory 109, a processor 110, a power supply 111, and other components. The electronic device further includes: an interface, a detection control module, a switch module, a first data line, and a second data line (not shown in FIG. 8). A width of the second data line is smaller than a width of the first data line and is lower than a preset threshold, and an interface is respectively electrically connected to the detection control module and the switch module. A person skilled in the art may understand that a structure of the electronic device shown in FIG. 1 constitutes no limitation on the electronic device, and the electronic device may include more or fewer components than those shown in the figure, or have a combination of some components, or have a different component arrangement. In this embodiment of this application, the electronic device includes but is not limited to a mobile phone, a tablet computer, a notebook computer, a palmtop computer, a vehicle-mounted terminal, a wearable device, a pedometer, or the like. The second data line and the first data line are electrically connected to the processor.

When the detection control module detects that the signal of the interface is a power supply signal, the movable end is connected to the first fixed end; when the detection control module detects that the signal of the interface is a data signal, the movable end is connected to the second fixed end connect.

It should be understood that, in this embodiment of this application, the radio frequency unit 101 may be configured to receive and send information or a signal in a call process. Alternatively, after receiving downlink data from a base station, the radio frequency unit sends the downlink data to the processor 110 for processing. In addition, the radio frequency unit sends uplink data to the base station. Usually, the radio frequency unit 101 includes but is not limited to an antenna, at least one amplifier, a transceiver, a coupler, a low noise amplifier, a duplexer, and the like. In addition, the radio frequency unit 101 may communicate with a network and another device through a wireless communication system.

The electronic device provides users with wireless broadband Internet access through the network module 102, for example, helps users receive and send e-mails, browse web pages, and access streaming media.

The audio output unit 103 may convert audio data received by the radio frequency unit 101 or the network module 102 or stored in the memory 109 into an audio signal and output the audio signal as a sound. Moreover, the audio output unit 103 can further provide audio output related to a specific function performed the electronic device (for example, call signal receiving sound and message receiving sound). The audio output unit 103 includes a speaker, a buzzer, a telephone receiver, and the like.

The input unit 104 is configured to receive an audio signal or a video signal. The input unit 104 may include a graphics processing unit (Graphics Processing Unit, GPU) 1041 and a microphone 1042. The graphics processing unit 1041 is used to process image data of a static picture or a video obtained by an image capturing device (for example, a camera) in a video capturing mode or an image capturing mode. A processed image frame may be displayed on the display unit 106. The image frame processed by the graphics processing unit 1041 may be stored in the memory 109 (or another storage medium) or sent via the radio frequency unit 101 or the network module 102. The microphone 1042 can receive sound and can process such sound into audio data. The processed audio data may be output by being converted into a format that may be sent to a mobile communications base station by using the radio frequency unit 101 in a telephone call mode.

The electronic device also includes at least one sensor 105, such as a light sensor, a motion sensor, and other sensors. Alternatively, the light sensor includes an ambient light sensor and a proximity sensor. The ambient light sensor may adjust luminance of a display panel 1061 according to ambient light luminance. The proximity sensor may switch off the display panel 1061 and/or backlight when the electronic device moves close to an ear. As a type of the motion sensor, an accelerometer sensor may detect an acceleration value in each direction (generally, three axes), and detect a value and a direction of gravity when the accelerometer sensor is static, and may be used for recognizing a posture of the electronic device (such as screen switching between landscape and portrait modes, a related game, or magnetometer posture calibration), a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information entered by a user or information provided for a user. The display unit 106 may include the display panel 1061, and the display panel 1061 may be configured in a form of a liquid crystal display (Liquid Crystal Display, LCD), an organic light-emitting diode (Organic Light-Emitting Diode, OLED), or the like.

The user input unit 107 may be configured to: receive input digital or character information, and generate key signal input related to a user setting and function control of the electronic device. Alternatively, the user input unit 107 includes a touch panel 1071 and another input device 1072. The touch panel 1071, also called a touch screen, may collect touch operation on or near the touch panel by users (for example, operation on the touch panel 1071 or near the touch panel 1071 by fingers or any suitable objects or accessories such as a touch pen by the users). The touch panel 1071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, sends the touch point coordinates to the processor 110, and receives and executes a command sent by the processor 110. In addition, the touch panel 1071 may be implemented in various types such as a resistor, a capacitor, an infrared ray, or a surface acoustic wave. The user input unit 107 may further include another input device 1072 in addition to the touch panel 1071. Alternatively, the another input device 1072 may include but is not limited to a physical keyboard, a functional button (such as a volume control button or a power on/off button), a trackball, a mouse, and a joystick. Details are not described herein.

Further, the touch panel 1071 may cover the display panel 1061. When detecting the touch operation on or near the touch panel, the touch panel 1071 transmits the touch operation to the processor 110 to determine a type of a touch event, and then the processor 110 provides corresponding visual output on the display panel 1061 based on the type of the touch event. Although in FIG. 8, the touch panel 1071 and the display panel 1061 are configured as two independent components to implement input and output functions of the electronic device, in some embodiments, the touch panel 1071 and the display panel 1061 can be integrated to implement the input and output functions of the electronic device. Details are not limited herein.

The interface circuit 108 is an interface for connecting an external apparatus to the electronic device. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface circuit 108 may be configured to receive input (for example, data information and power) from an external apparatus and transmit the received input to one or more elements in the electronic device or may be configured to transmit data between the electronic device and an external apparatus.

The memory 109 may be configured to store a software program and various data. The memory 109 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 109 may include a high-speed random access memory, and may further include a nonvolatile memory, for example, at least one magnetic disk storage device, a flash storage device, or another volatile solid-state storage device.

The processor 110 is a control center of the electronic device, connects all parts of the entire electronic device by using various interfaces and lines, and performs various functions of the electronic device and data processing by running or executing a software program and/or a module that are/is stored in the memory 109 and by invoking data stored in the memory 109, to overall monitor the electronic device. The processor 110 may include one or more processing units. Preferably, an application processor and a modem processor may be integrated into the processor 110. The application processor mainly processes an operating system, a user interface, an application, and the like. The modem processor mainly processes wireless communications. It can be understood that, alternatively, the modem processor may not be integrated into the processor 110.

The electronic device may further include the power supply 111 (such as a battery) supplying power to each component. Preferably, the power supply 111 may be logically connected to the processor 110 by using a power management system, so as to implement functions such as charging management, discharging management and power consumption management by using the power management system.

In addition, the electronic device includes some functional modules not shown. Details are not described herein.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not preclude the presence of other identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present application essentially, or the part contributing to the prior art may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of the present application.

The embodiments of the present application are described above with reference to the accompanying drawings, but the present application is not limited to the foregoing specific implementations. The foregoing specific implementations are merely schematic instead of restrictive. Under enlightenment of the present application, a person of ordinary skills in the art may make many forms without departing from aims and the protection scope of claims of the present application, all of which fall within the protection scope of the present application.

The invention claimed is:

1. An interface circuit, comprising: an interface, a detection control module, a switch module, a first signal line, and a second signal line, wherein a width of the second signal line is smaller than that of the first signal line, the interface is electrically connected to the detection control module and a movable end of the switch module, a first fixed end of the switch module is electrically connected to the first signal line, and a second fixed end of the switch module is electrically connected to the second signal line;

in a case that the detection control module detects that a signal received by the interface is a power supply signal, the movable end is connected to the first fixed end; and in a case that the detection control module detects that a signal of received by the interface is a data signal, the movable end is connected to the second fixed end;

wherein the interface comprises a first pin and a second pin;

in a case that the detection control module detects that an input voltage of the first pin is higher than a threshold, a signal received by the interface is a data signal, and the detection control module controls the movable end of the switch module to connect to the second fixed end, so that the first pin is electrically connected to the second signal line; and in a case that the detection control module detects that an input voltage of the second pin is lower than a threshold, a signal received by the interface is a power supply signal, and the detection control module controls the movable end of the switch module to connect to the first fixed end, so that the second pin is electrically connected to the first signal line.

2. The interface circuit according to claim 1, wherein the switch module is a double-pole double-throw switch or at least two single-pole single-throw switches.

3. The interface circuit according to claim 1, wherein the switch module is a double-pole double-throw switch, the first signal line comprises a first connection end and a second connection end, the second signal line comprises a third connection end and a fourth connection end, the first pin of the interface is connected to a first movable end of the double-pole double-throw switch, the second pin of the interface is connected to a second movable end of the double-pole double-throw switch, a first fixed end of the double-pole double-throw switch is connected to the third connection end, a second fixed end of the double-pole double-throw switch is connected to the second connection end, a third fixed end of the double-pole double-throw switch is connected to the first connection end, and a fourth fixed end of the double-pole double-throw switch is connected to the fourth connection end.

4. The interface circuit according to claim 3, wherein the detection control module is further configured to: when detecting that the input voltage of the first pin is higher than a preset threshold and the input voltage of the second pin is lower than a preset threshold, control a first movable end of the double-pole double-throw switch to connect to the first fixed end, and control a second movable end of the double-pole double-throw switch to connect to the second fixed end.

5. The interface circuit according to claim 3, wherein two connection ends of the second signal line are a first connection end and a second connection end, and the detection control module is further configured to: when detecting that the voltage of the first pin is not greater than the preset threshold and the voltage of the second pin is greater than the preset threshold, control the first movable end of the double-pole double-throw switch to connect to the third fixed end and control the second movable end of the double-pole double-throw switch to connect to the fourth fixed end.

6. The interface circuit according to claim 1, wherein the detection control module comprises a voltage change detection unit and a control unit, and the interface, the voltage change detection unit, and the control unit are electrically connected in sequence.

7. The interface circuit according to claim 6, wherein the voltage change detection unit comprises a first comparator and a second comparator;

a first input end of the first comparator is electrically connected to the first pin of the interface, a second input end of the first comparator is connected to a reference voltage input end, and an output end of the first comparator is electrically connected to the control unit; and a first input end of the second comparator is electrically connected to the second pin of the interface, a second input end of the second comparator is connected to the reference voltage input end, and an output end of the second comparator is electrically connected to the control unit.

8. The interface circuit according to claim 6, wherein the voltage change detection unit comprises a first ADC unit and a second ADC unit;

an input end of the first ADC unit is electrically connected to the first pin of the interface, and an output end of the first ADC unit is electrically connected to the control unit; and an input end of the second ADC unit is electrically connected to the second pin of the interface, and an output end of the second ADC unit is electrically connected to the control unit.

9. An electronic device, wherein the electronic device is installed with the interface circuit according to claim 1, wherein the first signal line and the second signal line are respectively electrically connected to a main control chip of the electronic device.

10. An electronic device, wherein the electronic device is installed with the interface circuit according to claim 2, wherein the first signal line and the second signal line are respectively electrically connected to a main control chip of the electronic device.

11. An electronic device, wherein the electronic device is installed with the interface circuit according to claim 3, wherein the first -signal line and the second signal line are respectively electrically connected to a main control chip of the electronic device.

12. An electronic device, wherein the electronic device is installed with the interface circuit according to claim 4, wherein the first signal line and the second signal line are respectively electrically connected to a main control chip of the electronic device.

13. An electronic device, wherein the electronic device is installed with the interface circuit according to claim 5, wherein the first signal line and the second signal line are respectively electrically connected to a main control chip of the electronic device.

14. An electronic device, wherein the electronic device is installed with the interface circuit according to claim 6, wherein the first signal line and the second signal line are respectively electrically connected to a main control chip of the electronic device.

15. An electronic device, wherein the electronic device is installed with the interface circuit according to claim 7, wherein the first signal line and the second signal line are respectively electrically connected to a main control chip of the electronic device.

16. An electronic device, wherein the electronic device is installed with the interface circuit according to claim 8, wherein the first signal line and the second signal line are respectively electrically connected to a main control chip of the electronic device.

* * * * *

UNITED STATES PATENT AND TRADEMARK OFFICE
CERTIFICATE OF CORRECTION

PATENT NO. : 12,013,803 B2
APPLICATION NO. : 17/988372
DATED : June 18, 2024
INVENTOR(S) : Bo Li It is certified that error appears in the above-identified patent and that said Letters Patent is hereby corrected as shown below:

In the Claims

Claim 1, Column 9, Line 44, delete "of".

Claim 11, Column 11, Line 11, delete "-".

Signed and Sealed this
Twenty-third Day of July, 2024

Katherine Kelly Vidal
*Director of the United States Patent and Trademark Office*